United States Patent [19]

Schadegg et al.

[11] Patent Number: 5,844,911
[45] Date of Patent: Dec. 1, 1998

[54] DISC STORAGE SYSTEM WITH SPARE SECTORS DISPERSED AT A REGULAR INTERVAL AROUND A DATA TRACK TO REDUCED ACCESS LATENCY

[75] Inventors: John Schadegg, Niwot; Neal Glover, Broomfield; Laura Droege Shellhamer, Longmont; William L. Witt, Broomfield; Richard T. Behrens, Lafayette, all of Colo.

[73] Assignee: Cirrus Logic, Inc., Fremont, Calif.

[21] Appl. No.: 761,993

[22] Filed: Dec. 12, 1996

[51] Int. Cl.⁶ ............................ G01R 31/28; G11B 7/00
[52] U.S. Cl. ................................. 371/10.2; 395/183.18
[58] Field of Search ............................... 371/10.2, 40.13, 371/40.15, 40.3, 40.14, 51.1, 40.2, 40.4, 40.16; 395/182.04, 182.05, 182.06, 183.18, 185.07, 185.05, 185.01; 369/44.28, 44.32, 53, 56–58

[56] References Cited

U.S. PATENT DOCUMENTS

| | | |
|---|---|---|
| 4,214,280 | 7/1980 | Halfhill et al. . |
| 4,811,124 | 3/1989 | Dujari et al. . |
| 5,235,585 | 8/1993 | Bish et al. . |
| 5,237,553 | 8/1993 | Fukushima et al. . |
| 5,271,018 | 12/1993 | Chan . |
| 5,319,627 | 6/1994 | Shinno et al. ............................ 369/54 |
| 5,324,926 | 6/1994 | Horiguchi et al. ...................... 235/494 |
| 5,367,652 | 11/1994 | Golden et al. ........................... 395/499 |
| 5,406,534 | 4/1995 | Hisakado et al. ......................... 369/32 |
| 5,438,560 | 8/1995 | Lee ........................................... 369/58 |
| 5,450,251 | 9/1995 | Kitigawa . |
| 5,526,335 | 6/1996 | Tamegai .................................... 369/58 |
| 5,532,992 | 7/1996 | Funamoto ................................. 369/47 |
| 5,541,903 | 7/1996 | Funahashi et al. ....................... 369/54 |
| 5,583,842 | 12/1996 | Wilson et al. ............................ 369/54 |
| 5,701,304 | 12/1997 | Glover et al. .......................... 371/10.2 |

*Primary Examiner*—Joseph Palys
*Assistant Examiner*—Nadeem Iqbal
*Attorney, Agent, or Firm*—Howard H. Sheerin; Dan A. Shifrin

[57] ABSTRACT

A defect management system is disclosed for disc storage systems which avoids the access latency associated with conventional linear replacement techniques by dispersing spare segments throughout each track at a regular interval and buffering sectors inbetween a defective sector and the corresponding spare segment during read and write operations. In one embodiment, a spare segment is an entire sector which replaces a defective data sector; and in an alternative embodiment, a spare segment stores only the defective portion of a data sector which is more efficient, but also more complicated in implementation. In both embodiments, the defect management system comprises a defect locator for locating a defective segment within a data sector. Once located, the defect management system maps the defective sector (or the defective portion thereof) to the nearest available spare segment. Then when accessing the track that comprises the defective sector, the data sectors between the defective segment and corresponding spare segment are buffered in a data buffer, and an area in the data buffer is reserved for storing the data associated with the spare segment. In this manner, data can be written to and read from the track in a contiguous sequence without requiring an extra revolution of latency as in the conventional linear replacement defect mapping techniques.

35 Claims, 9 Drawing Sheets

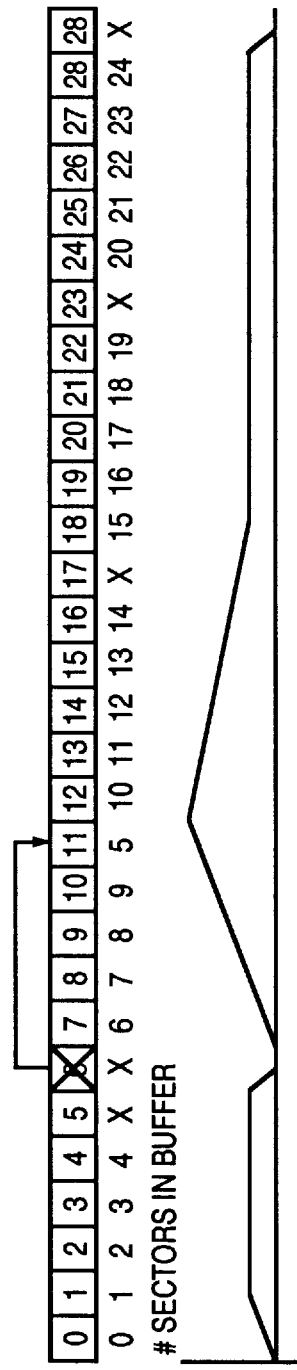
FIG. 5A
FIG. 5B
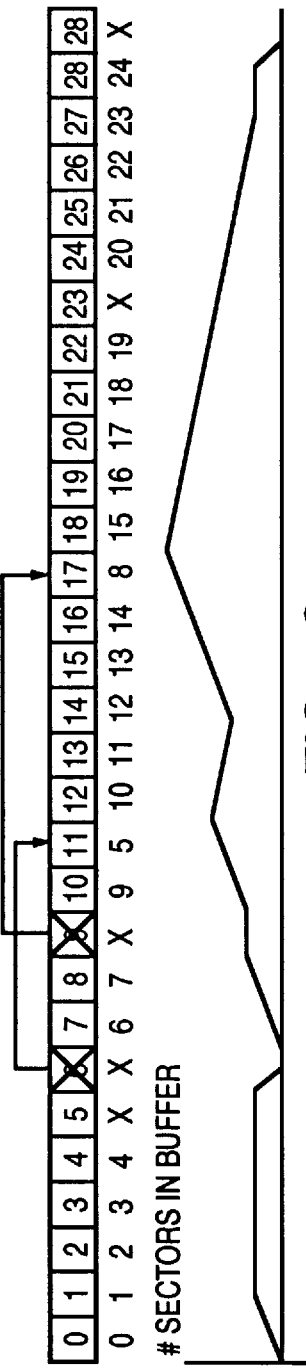
FIG. 5C

DISC STORAGE SYSTEM WITH SPARE SECTORS DISPERSED AT A REGULAR INTERVAL AROUND A DATA TRACK TO REDUCED ACCESS LATENCY

CROSS-REFERENCE TO RELATED PATENTS AND APPLICATIONS

This patent application is related to other U.S. patents and patent applications. Namely, U.S. patent application Ser. No. 08/697,686 entitled "A Sector and Track Level Error Correction System for Disc Storage Systems," Ser. No. 08/313,491 entitled "Improved Timing Recovery for Synchronous Partial Response Recording," and Ser. No. 08/745,913 entitled "Thermal Asperity Compensation using Multiple Sync Marks for Retroactive and Split Segment Data Synchronization in a Magnetic disc Storage System," and U.S. Pat. No. 5,563,746 entitled "Real Time Media Defect Scanning in a Sampled Amplitude Read Channel," U.S. Pat. No. 5,446,743 entitled "Coefficient Update Method and Apparatus for Reed-Solomon Decoder," and U.S. Pat. No. 5,467,297 entitled "Finite Field Inversion". The above referenced patent and patent applications are hereby incorporated by reference.

FIELD OF INVENTION

The present invention relates to disc storage systems, such as magnetic and optical, particularly to a system for defect mapping defective data segments (sectors or parts thereof) to spare data segments, where the spare data segments are dispersed at a regular interval around a data track and the data sectors inbetween buffered in a data buffer in order to reduce access latency during read and write operations.

BACKGROUND OF THE INVENTION

Magnetic and optical disc storage devices are commonly used by host computer systems to store large amounts of digital data in a non-volatile manner. Typically, the disc storage medium spinning within the storage device is partitioned into a number of data tracks (concentrically spaced for magnetic and concentric or spiral for optical), where each data track is further partitioned into a number of data sectors. To write and read data to and from a target data sector on a particular track, a recording head (read/write head) is positioned over the track by an electromechanical servoing mechanism. Then, to write data to the track, the data serves to modulate a current in a write coil (or intensity of a laser beam) of the recording head in order to write a sequence of corresponding magnetic flux (or reflective optical) transitions onto the surface of the disc. To read this recorded data, the recording head again passes over the track and emits an analog read signal comprising a sequence of pulses induced by the magnetic flux (or reflective optical) transitions. These pulses are then detected and decoded into an estimated data sequence by a read channel and, in the absence of errors, the estimated data sequence matches the recorded data sequence.

When the storage medium is manufactured, it will contain flaws or defects due, for example, to process imperfections and impurities such as foreign particles embedded onto the surface of the disc. Such defects often times render the flawed area of the disc unusable; however, rather than discard the entire disc, methods are employed to "map out" the defects. Conventionally, the storage medium is tested after manufacturing to determine those sectors with defective segments. The corresponding sector numbers are compiled into a primary defect list which is then stored on a reserved area of the disc. When the storage system is powered on, the primary defect list is read from the disc and used by a defect management system to map the defective sectors to spare sectors.

To facilitate defect management, each data track typically comprises L data sectors, and M spare sectors for mapping out defective sectors. Two addresses are typically associated with each sector of a track: a physical sector number (PSN) and a logical sector number (LSN). The PSN identifies the physical location of a sector within a track (see FIG. 3B) including defective data sectors and spare sectors (i.e., PSN=0–>N), whereas the LSN identifies the logical sequence number of the data sectors for a track (i.e., LSN=0–>L–1). The data sectors of a track are accessed by specifying the LSN rather than the PSN. In this manner, a defective sector can be "mapped out" using a spare sector by rearranging the assignment of logical sector numbers to physical sector numbers.

This is illustrated in FIG. 4A which shows an exemplary data track comprising 25 data sectors and 2 spare sectors located at the end of the track, none of which are defective, and FIG. 4B which shows a similar data track where the sixth sector (PSN=5) is defective. The defective sector (PSN=5) is mapped to the 26th sector (PSN=25) such that the sixth logical sector number (PSN=5) is assigned to the first spare sector (PSN=25). This method of defect mapping is referred to as "linear replacement" because the defective sector is simply mapped to a spare sector.

The obvious drawback with the linear replacement defect mapping of FIG. 4B is the resulting access latency. For example, if the host system attempts to access the entire track (read or write) while executing a data intense user application (such as an audio/visual application), there is a significant latency in accessing the data sectors sequentially. Referring to FIG. 4B, first the disc storage system must access logical sector numbers 0–4, then skip to the spare data sector (PSN=25) to read logical sector number 5, then skip physical sector numbers 0–5 and continue reading the remaining logical sector numbers 6–24. Thus, there is an additional revolution of latency required to read the entire track, and this latency is increased by yet another revolution for each additional defective sector.

A common method employed to avoid the access latency of linear replacement is referred to as "sector slipping" which is illustrated in FIG. 4C. In this method, the assignment of LSN to PSN simply skips the defective sector, and all of the LSN numbers are "slipped" by one. That is, the assignment of logical sectors to physical sectors is incremented by one, and the last logical sector (LSN=24) is assigned to the first spare sector (PSN=25). In this manner, the data sectors can be accessed in a contiguous sequence such that any sequence of sectors can be accessed in one revolution.

The drawback with the sector slipping technique of FIG. 4C is that it is normally employed only when the disc is initially formatted. Once data has been written to the disc, a sector that becomes unusable due to a "grown defect" is normally not slipped because it is too time consuming, and potentially dangerous, to slip not only the assignment of logical sector numbers, but also the contents of the sectors. In other words, if the data sectors of FIG. 4C were full of user data and the sixth physical sector (PSN=5) became defective, then sector slipping would require copying each sector to the next sector, starting with the last sector (LSN=24) and continuing to the defective sector (PSN=5).

There is, therefore, a need for a defect management system for disc storage systems capable of mapping defective segments of a data track to spare segments of the track while avoiding the access latency of conventional linear replacement defect mapping, and without moving the contents of the sectors (i.e., without sector slipping) as described above.

SUMMARY OF THE INVENTION

A defect management system is disclosed for disc storage systems which avoids the access latency associated with conventional linear replacement techniques by dispersing spare segments throughout each track at a regular interval and buffering sectors inbetween a defective sector and the corresponding spare segment during read and write operations. In one embodiment, a spare segment is an entire sector which replaces a defective data sector; and in an alternative embodiment, a spare segment stores only the defective portion of a data sector which is more efficient, but also more complicated in implementation. In both embodiments, the defect management system comprises a defect locator for locating a defective segment within a data sector. Once located, the defect management system maps the defective sector (or the defective portion thereof) to the nearest available spare segment. Then when accessing the track that comprises the defective sector, the data sectors between the defective segment and corresponding spare segment are buffered in a data buffer, and an area in the data buffer is reserved for storing the data associated with the spare segment. In this manner, data can be written to and read from the track in a contiguous sequence without requiring an extra revolution of latency as in the conventional linear replacement defect mapping techniques described above with reference to FIG. 4C.

For example, when writing to a track comprising a defective segment, a number of data sectors to be written are buffered in the data buffer, where the number of data sectors buffered is the number of sectors between the defective sector and the corresponding spare segment. When the recording head reaches the defective segment, the write operation pauses and the data segment stored in the data buffer associated with the defective segment is "skipped" over. After the recording head passes the defective segment, the rest of the buffered data are written to the track. Then when the recording head reaches the spare segment that replaced the defective segment, the "skipped" data segment stored in the data buffer is written to the spare segment. In this manner, all of the buffered data sectors can be written to the track in one revolution. Upon readback, the data sectors preceding and following the defective segment are read and stored in the data buffer, up to and including the spare segment associated with the defective segment. The transfer from the data buffer to the host system is delayed relative to when the spare sector is read. Again, this allows the entire sequence of data sectors to be read in one revolution and transferred to the host system in a contiguous sequence.

BRIEF DESCRIPTION OF THE DRAWINGS

The above and other aspects and advantages of the present invention will be better understood by reading the following detailed description of the invention in conjunction with the drawings, wherein:

FIG. 4A–4C illustrate defect mapping techniques in the prior art, including linear replacement in FIG. 4B and sector slipping in FIG. 4C.

FIG. 5A–5C illustrate the defect mapping technique of the present invention wherein a plurality of spare segments are dispersed at a regular interval throughout the track and between the data sectors.

DETAILED DESCRIPTION OF THE FIGURES

Overview

The present invention involves several aspects of defect management, including the ability to locate a defective segment within a data sector. Several techniques for locating a defective segment are disclosed, including: using a test pattern written to the data sector and performing a byte-by-byte comparison of the test pattern with the estimated data sequence generated upon readback; using error syndrome information in a sector level error correction system (ECS); using error syndrome information in a track level error correction system, such as a parity sector scheme; and using a defect detection system in a sampled amplitude read channel. Implementation details of the sector level and track level ECS are provided in the above referenced U.S. patent application Ser. No. 08/697,686, and details of the defect detection system in a sampled amplitude read channel are disclosed in U.S. Pat. No. 5,563,746. Certain high level aspects of these references which relate to the defect management system of the present invention are included in this disclosure.

Figure 1:
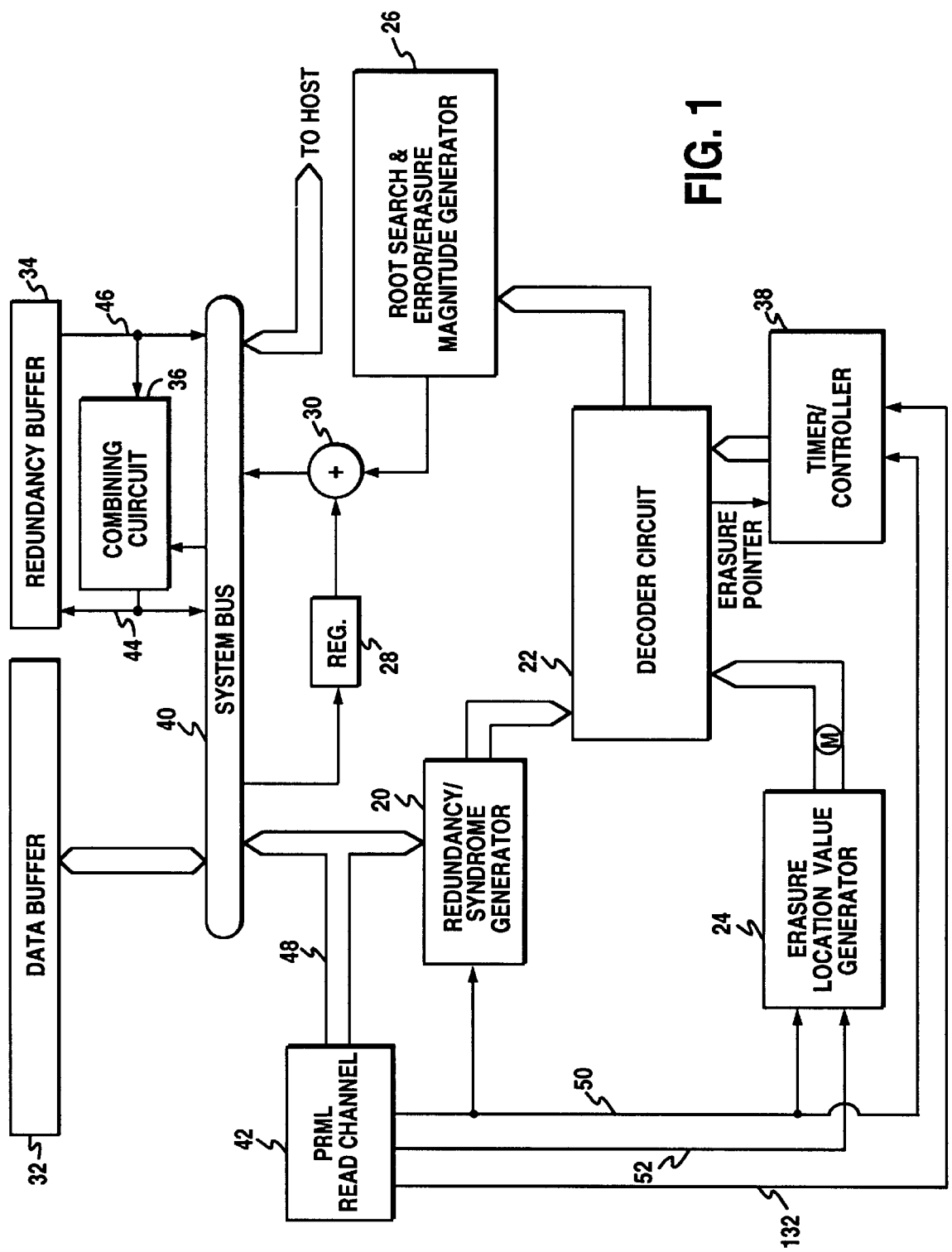
FIG. 1 is a schematic view generally showing a block diagram of the present invention including a sampled amplitude read channel, a sector level error correction system, and a track level error correction system.

FIG. 1 schematically illustrates the defect management and error correction system (ECS) according to an embodiment of the present invention, including a sector level ECS and a track level ECS. The sector level ECS comprises a redundancy/syndrome generator 20, a Reed-Solomon decoder 22 an erasure location value generator 24, a root search and error/erasure magnitude generator 26, and a register 28 and an XOR gate 30 for correcting data symbols in a codeword stored in data buffer 32. The track level error correction system comprises a redundancy buffer 34 for storing the redundancy sector as it is generated, and a combining circuit 36 for combining the data sectors and redundancy sector according to a predetermined error correction operation, such as byte XOR. A timer/controller 38 controls the overall operation of the system by executing the defect management operations as well as the sector level and track level error correction operations.

Information about the location of defective sectors and/or defective segments of sectors, as well as the location of corresponding replacement spares, is generated after the storage medium is manufactured, and when "grown defects" are detected during the normal operation of the storage system. This defect information is stored in non-volatile memory such as a reserved track on the disc or, alternatively, in a header field of every data sector or in a header field of the data sectors that comprise a defective segment. If a header field is provided only in the data sectors that have a defective segment, then the area consumed by the header field is also relocated to the spare segment. The timer/controller 38 retrieves the defect information when executing write and read operations in order to skip the defective sectors/segments and perform the necessary replacement mapping to the spare sectors/segments.

During a write operation, the storage system receives user data from a host system over a system bus 40 and stores the data in a data buffer 32. The data buffer 32 has the capacity to hold at least the number of sectors between a defective segment and the corresponding spare segment. When the system is ready to write a sector of data to the disc 42, the timer/controller 38 clears the redundancy buffer and reads a sector of user data from the data buffer 32. As the sector is read from the buffer, the redundancy/syndrome generator 20 generates sector level redundancy bytes 119 (shown in FIG. 3B) which are appended to the sector as it is written to the disc. Concurrently, the redundancy sector stored in the redundancy buffer 34 is updated by combining it (e.g., XORing) 36 with the user data. This is accomplished by reading an appropriate byte from the redundancy buffer 34 and combining 36 it with the corresponding user data byte applied over the system bus 40. The result is then written back to the redundancy buffer 34 over line 44. Depending on whether the storage system is configured into a "immediate redundancy regeneration" write mode or "deferred redundancy regeneration" write mode, the contents of the redundancy buffer after processing all of the user data to be written to the disc will be either the redundancy for the entire track, or the redundancy for the sectors written. In either case, the redundancy sector itself is applied to the system bus 40 over line 46 and processed by the syndrome/redundancy generator 20 to generate sector level redundancy bytes which are appended to the redundancy sector as it is written to the disc.

During a read operation a sector of data is read from the disc 42 and applied over line 48 to the system bus 40. A sector reset signal on line 50 resets the redundancy/syndrome generator 20, the erasure location value generator 24 and the timer/controller 38 every time a new sector is about to be read from the disc 42. Then, as the next sector is read, the redundancy/syndrome generator 20 generates error syndromes for use by the decoder circuit 22 and the sector is stored in the data buffer 32 for subsequent correction in the event that errors are detected (i.e., non-zero syndromes are generated). The decoder circuit 22 processes the error syndromes to generate an error location polynomial which is processed by the root search and error/erasure magnitude generator 26 to determine the location and correction values for the errors in the sector. In addition, the decoder circuit 22 may utilize erasure pointer information generated by the erasure location value generator 24. For instance, a read channel may generate erasure pointers associated with retroactive resynchronization (described below) applied over line 52.

To correct a sector using the sector level ECS, a codeword symbol in error is read from the data buffer 32 into register 28 and XORed 30 with the error correction value. The corrected symbol is then restored to the data buffer 32 and the corrected sector transferred to the host system. The sector level error correction operations described above are carried out in asynchronous and overlapping steps in order to facilitate un-interrupted, or "on-the-fly", transfer of data from the disc.

In the event that the number of errors in a data sector exceeds the correction capability of the sector level ECS, the track level ECS attempts to recover the data sector as follows. First, the recording head is oriented over the first sector in the track (SECTOR 0). Then the storage system attempts to read all of the sectors in the track including the unrecoverable sector and the redundancy sector. As each sector is read, the sector data is combined 36 according to a predetermined error correction operation (e.g., byte XOR) and the result stored in the redundancy buffer 34. The sector data can be combined 36 into the redundancy buffer 34 after it has been corrected by the sector level ECS, but in the preferred embodiment, the sector data is combined 36 with the redundancy buffer 34 as the sector is read from the disc 42 (i.e., the uncorrected sector data is combined with the redundancy buffer). In the latter embodiment, the error correction values generated by the sector level ECS are combined 36 "on-the-fly" with the redundancy buffer 34 so that the track level redundancy data accounts for corrections made at the sector level. After reading the sectors on the disc, the redundancy buffer 34 contains either error syndromes for correcting a data sector uncorrectable at the sector level, or it contains a reconstructed image of an unreadable data sector.

If the data sector is uncorrectable at the sector level, then it is corrected by combining it with the error syndromes in the redundancy buffer 34. This is accomplished by reading each symbol of the uncorrectable sector from the data buffer 32 and combining it 36 with the corresponding syndrome stored in the redundancy buffer 34. The corrected symbol is then restored to the data buffer 32. If the data sector is unreadable, then it is simply replaced by transferring the contents of the redundancy buffer 34 to the data buffer 32.

The error syndromes generated by the redundancy/syndrome generator 20 at the sector level may indicate the presence of a hard error caused by a defect in the storage medium. The existence of a hard error can be verified by rereading the sector several times to determine if the error syndromes point to the same location within the sector. Thus, in the preferred embodiment, when the number of errors detected by the sector level ECS exceeds a predetermined threshold, or if the number of errors exceeds the error correction capability of the sector level ECS, then after recovering the sector using the track level ECS the sector is queued for defect mapping during idle time. The idle time defect mapping routine rewrites and reads a defective sector several times to verify the persistency of the defect. If the defect does not persist, then the sector is left unchanged. Otherwise, the location of hard errors caused by the defects are determined from the persistent error syndromes. When the number of errors exceeds the error correction capability of the sector level ECS such that the error syndromes are meaningless, the location of defects are determined from the error syndromes generated by the track level ECS.

Yet another simplified method for determined the location of defects within a data sector is to write a test pattern of data to the sector and to compare the test pattern to the estimated data sequence generated upon readback. The locations of persistent inequalities between the test pattern and the estimated data sequence indicate the locations of defects.

There are certain drawbacks associated with the above described methods for determining the location of defects within a sector. Namely, if a sector becomes unreadable due to an inability to byte synchronize to the data because a defect has corrupted the timing information (preamble 114 and/or sync mark 116 of FIG. 3B), then the sector level ECS, track level ECS and the above test pattern technique are rendered useless for finding the location of defects within the sector. To protect against an inability to byte synchronize to the data, the preferred embodiment of the present invention employs multiple sync marks and retroactive synchronization. In general, multiple sync marks allow the system to byte synchronize to the entire data sector using secondary sync marks when the primary sync mark recorded at the beginning of the sector has been corrupted by a defect. See the above reference U.S. patent application Ser. No. 08/745, 913 for details concerning the multiple sync mark and retroactive synchronization aspect of the present invention.

Yet another method for determining the location of defects within a sector which does not depend on the ability to byte synchronize to the data is to use a defect detection system within a sampled amplitude read channel. An overview of a sampled amplitude read channel employing a defect detection system is described in the following section with reference to FIG. 2, and the reader is also referred to U.S. Pat. No. 5,563,746 for a more detailed description of this aspect of the invention.

Sampled Amplitude Read Channel

Figure 2:
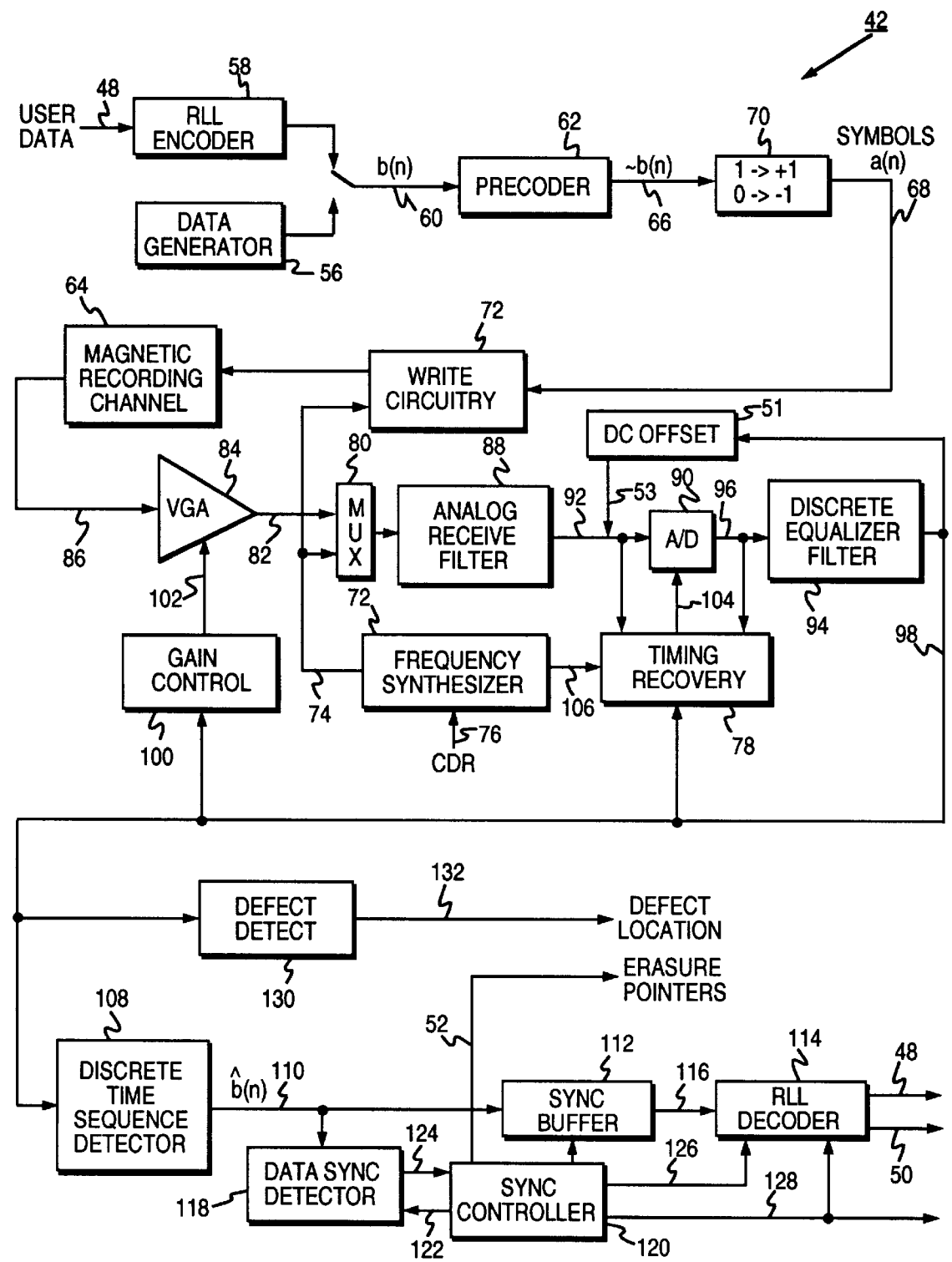
FIG. 2 shows a block diagram of a sampled amplitude read channel of FIG. 1.

Referring now to FIG. 2, shown is a detailed block diagram of a sampled amplitude read channel 2 (e.g., partial response maximum likelihood (PRML) read channel) of FIG. 1. During a write operation, the read channel receives the user data to be stored to the disc over data bus 48. A data generator 56 generates preamble data (for example 2T preamble data) written to the disc prior to writing the user data. The data generator 56 also generates a primary sync mark and at least one secondary sync mark, both for use in synchronizing to the user data during a read operation. An RLL encoder 58 encodes the user data into a binary sequence b(n) 60 according to an RLL code constraint. A precoder 62 precodes the binary sequence b(n) 60 in order to compensate for the transfer function of the recording channel 64 and equalizing filters to form a precoded sequence ~b(n) 66. The precoded sequence ~b(n) 66 is converted into symbols a(n) 68 by translating 70 ~b(N)=0 into a(N)=−1, and ~b(N)=1 into a(N)=+1. Write circuitry 72, responsive to the symbols a(n) 68, modulates the current in the recording head coil (or intensity of a laser beam) at the zone baud rate to record a sequence of magnetic (or reflective) transitions onto the surface of the disc 64, wherein the transitions represent the recorded data. A frequency synthesizer 72 provides a baud rate write clock 74 to the write circuitry 72 and is adjusted by a baud or channel data rate signal (CDR) 76 according to the zone the recording head is over.

When reading the recorded binary sequence from the magnetic or optical disc, timing recovery 78 first locks to the write frequency by selecting, as the input to the read channel, the write clock 74 through a multiplexor 80. Once locked to the write frequency, the multiplexor 80 selects the analog signal 82 from the read head as the input to the read channel in order to phase lock timing recovery 78 to the acquisition preamble 114 recorded prior to the user data (see FIG. 3B). A variable gain amplifier 84 adjusts the amplitude of the analog read signal 86, and an analog filter 88 provides initial equalization toward the desired response as well as attenuates aliasing noise. A sampling device 90 (normally an analog-to-digital converter (A/D)) samples the analog read signal 92 output by the analog filter 88, and a discrete time filter 94 provides further equalization of the sample values 96 toward the desired response.

The equalized sample values 98 are applied to decision directed gain control 100 and timing recovery 78 for adjusting the amplitude of the read signal 86 and the frequency and phase of the sampling device 90, respectively. Gain control 100 adjusts the gain of variable gain amplifier 84 over line 102, and timing recovery 78 adjusts the frequency of sampling device 90 over line 104 in order to synchronize the equalized samples 98 to the baud rate. Frequency synthesizer 72 provides a course center frequency setting to timing recovery 78 over line 106 in order to center the timing recovery frequency over temperature, voltage, and process variations. The channel data rate (CDR) signal 76 adjusts a frequency range of the synthesizer 72 according to the baud rate for the current zone. A DC offset circuit 51 also processes the equalized samples 98 to track the DC drift in the analog read signal 92. The DC offset is computed and converted into an analog signal 53 that is subtracted from the analog read signal 92, thereby attenuating the deleterious effect a DC offset can have on the detection algorithm.

The equalized samples 98 are ultimately input into a discrete time sequence detector 108, such as a maximum likelihood (ML) Viterbi sequence detector, which detects an estimated binary sequence ^b(n) 110. The estimated binary sequence 110 is buffered in a synchronization buffer 112 to facilitate byte synchronizing (framing) the user data. An RLL decoder 114 decodes the estimated binary sequence 116 output from the sync buffer 112 into estimated decoded user data 48. A data sync detector 118 detects a primary and a secondary sync mark in the estimated binary sequence 110 in order to frame the operation of the RLL decoder 114. In the absence of errors, the estimated binary sequence ^b(n) 110 equals the recorded binary sequence b(n) 60, and the decoded user data 48 equals the recorded user data.

A defect in the storage medium may corrupt the timing recovery preamble or sync mark information, thereby preventing byte synchronization (or framing) of the user data. The inability to synchronize to the user data renders the error correction capability useless, even though most, if not all, of the user data may be uncorrupted. The present invention protects against losing an entire sector when the synchronization information is corrupted by errors by providing at least one secondary synchronization field (sync mark and an optional preamble) for each data sector. In this manner, if the primary synchronization field (preamble and/or sync mark)

is corrupted, synchronization may still be achieved using the secondary synchronization field. This significantly improves the chances of successful byte synchronization because of the lower probability that both synchronization fields for a given sector will be corrupted. Further, as long as byte synchronization is possible, the defective segments of a sector can be located and mapped to spare segments.

To this end, the read channel of FIG. 2 comprises a sync controller 120 for controlling operation of the sync mark detector 118, the sync buffer 112, and the RLL decoder 114. After timing recovery processes the acquisition preamble, the sync controller 120 enables the sync mark detector 118 over line 122 to begin searching for the primary sync mark at the beginning of the sector. Concurrently, the sync controller 120 enables the sync buffer 112 to begin buffering the estimated data sequence 110. If the primary sync mark is successfully detected, the sync mark detector signals the sync controller over line 124, which in turn enables the RLL decoder 114 over line 126 to begin decoding and transferring the user data 48 to the host system. The RLL decoder also activates line 50 to signal the sector level ECS of FIG. 1 that a new codeword is being transferred. If the primary sync mark is corrupted and undetectable, then the estimated data sequence 110 continues to be buffered into the sync buffer 112 until the sync mark detector 118 detects a secondary sync mark within the user data field. Once a secondary sync mark has been detected, the sync controller 120 retroactively synchronizes all of the data buffered in the sync buffer 112 and begins the RLL decode 114 and transfer to the ECC system of FIG. 1. To avoid any latency associated with retroactive synchronization, the sync controller 120 also generates a data clock over line 128 for decoding and transferring the data to the ECC system at a rate faster than the read rate. In this manner, the sync buffer 112 is eventually emptied before reaching the end of the sector, thereby avoiding any delay associated with buffering the estimated data sequence 110.

The sampled amplitude read channel of FIG. 2 further comprises a defect detection system 130 for determining the location of defects in a sector by analyzing the sample values 98. As explained in greater detail in the above referenced U.S. Pat. No. 5,563,746, the defect detection system 130 comprises a discrete time filter with an impulse response substantially matched to an error signature in the sample values 98 caused by a defect in the storage medium. When the output of the defect detection filter exceeds a predetermined threshold, a signal 132 is transmitted to the controller 38 of FIG. 1 to indicate the presence and location of the defect. The controller 38 then performs the steps necessary to map the defective segment to a spare segment as described below.

Data Format

Figure 3A:
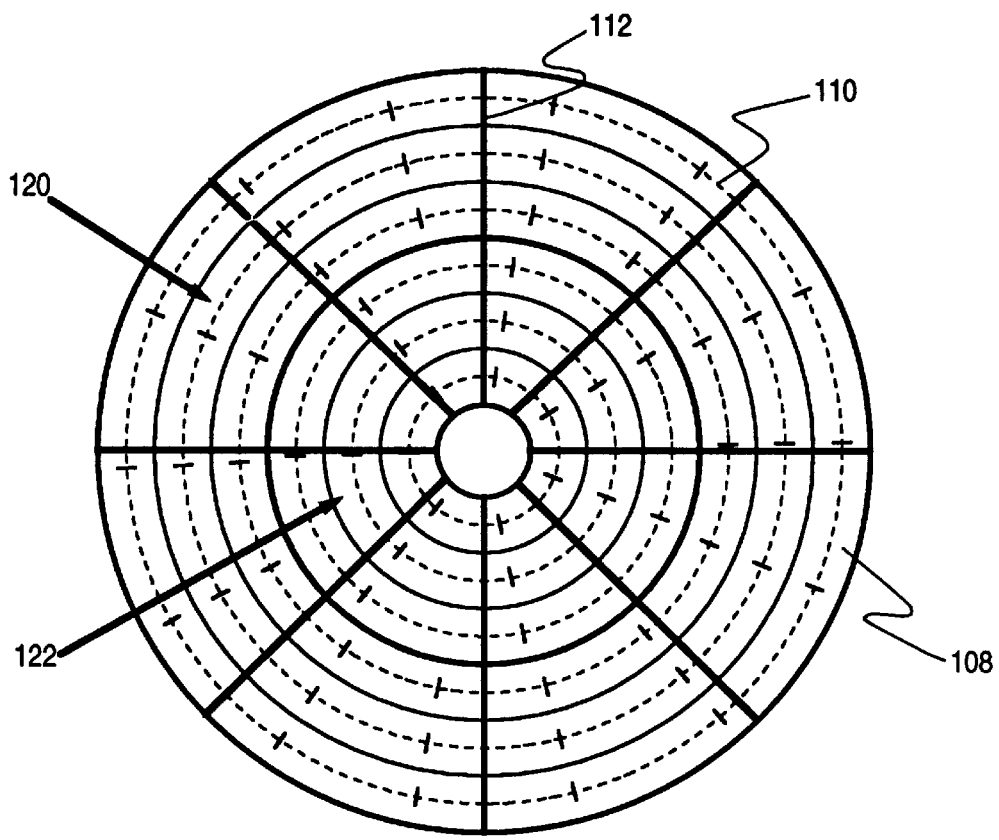
FIG. 3A shows the data format of the magnetic disc comprising a plurality of zoned data sectors and embedded servo wedges.

FIG. 3A shows a conventional data format of a magnetic disc storage medium comprising a series of concentric, radially spaced data tracks 108 wherein each data track 108 comprises a plurality of sectors 110 with embedded servo wedges 112. A servo controller (not shown) processes the servo data in the servo wedges 112 and, in response thereto, positions the read/write head over a desired track. Additionally, the servo controller processes servo bursts within the servo wedges 112 to keep the head aligned over a centerline of the desired track while writing and reading data. The servo wedges 112 may be detected by a simple discrete time pulse detector or by the discrete time sequence detector 90 of FIG. 2. The format of the servo wedges 112 includes a preamble and a sync mark, similar to the user data sectors 110 described below with reference to FIG. 3B.

Zoned recording is a technique known in the art for increasing the storage density by recording the user data at different rates in predefined zones between the inner diameter and outer diameter tracks. The data rate can be increased at the outer diameter tracks due to the increase in circumferential recording area and the decrease in intersymbol interference. This allows more data to be stored in the outer diameter tracks as is illustrated in FIG. 3A where the disc is partitioned into an outer zone 120 comprising fourteen data sectors per track, and an inner zone 122 comprising seven data sectors per track. In practice, the disc may actually be partitioned into several zones at varying data rates.

Figure 3B:
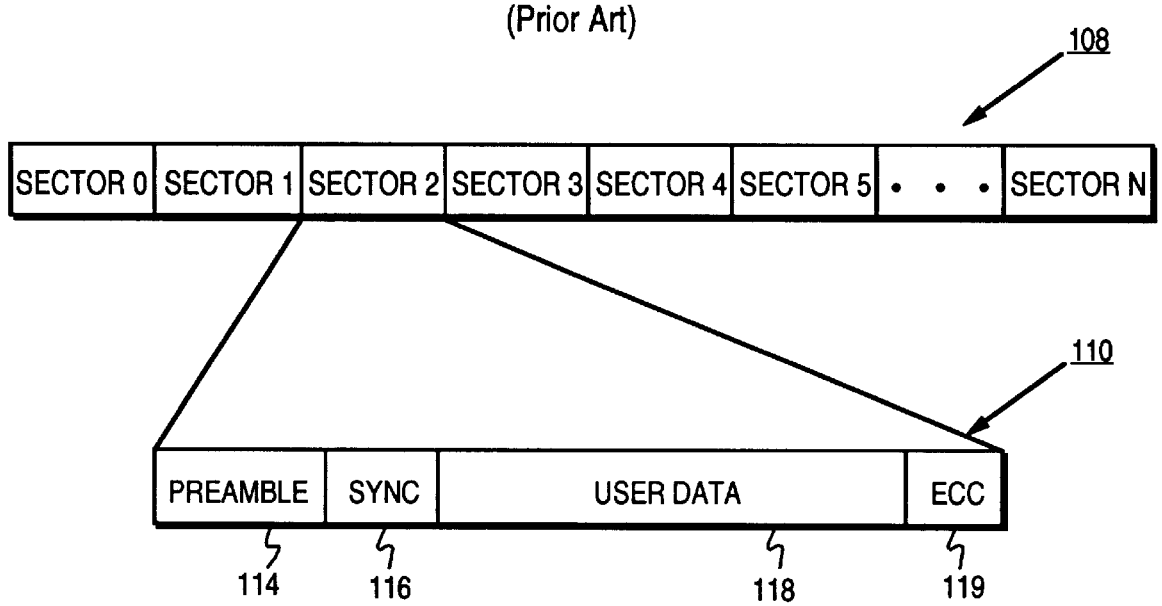
FIG. 3B shows a typical format of a track as a linear sequence 0->N of sectors, as well as the format of each sector.

FIG. 3B shows the format of a conventional user data sector 110 comprising an acquisition preamble 114, a sync mark 116, and a user data field 118 including appended ECC bytes 119 for use in detecting and correcting errors in the user data upon readback. Timing recovery 62 of FIG. 2 processes the acquisition preamble 114 to acquire the correct sampling frequency and phase before reading the user data field 118, and the sync mark 116 is used to byte synchronize to the user data field 118. As described above, errors induced through system dynamics (e.g., medium defects) can corrupt the preamble and/or sync mark fields which may render the entire data sector unrecoverable. As will become more apparent from the following description, the present invention provides secondary sync marks (and optional secondary preambles) in order to retroactively synchronize to the user data when the primary preamble and/or sync mark fields are corrupted.

Sector Defect Mapping

Figures 4A, 4B, 4C:
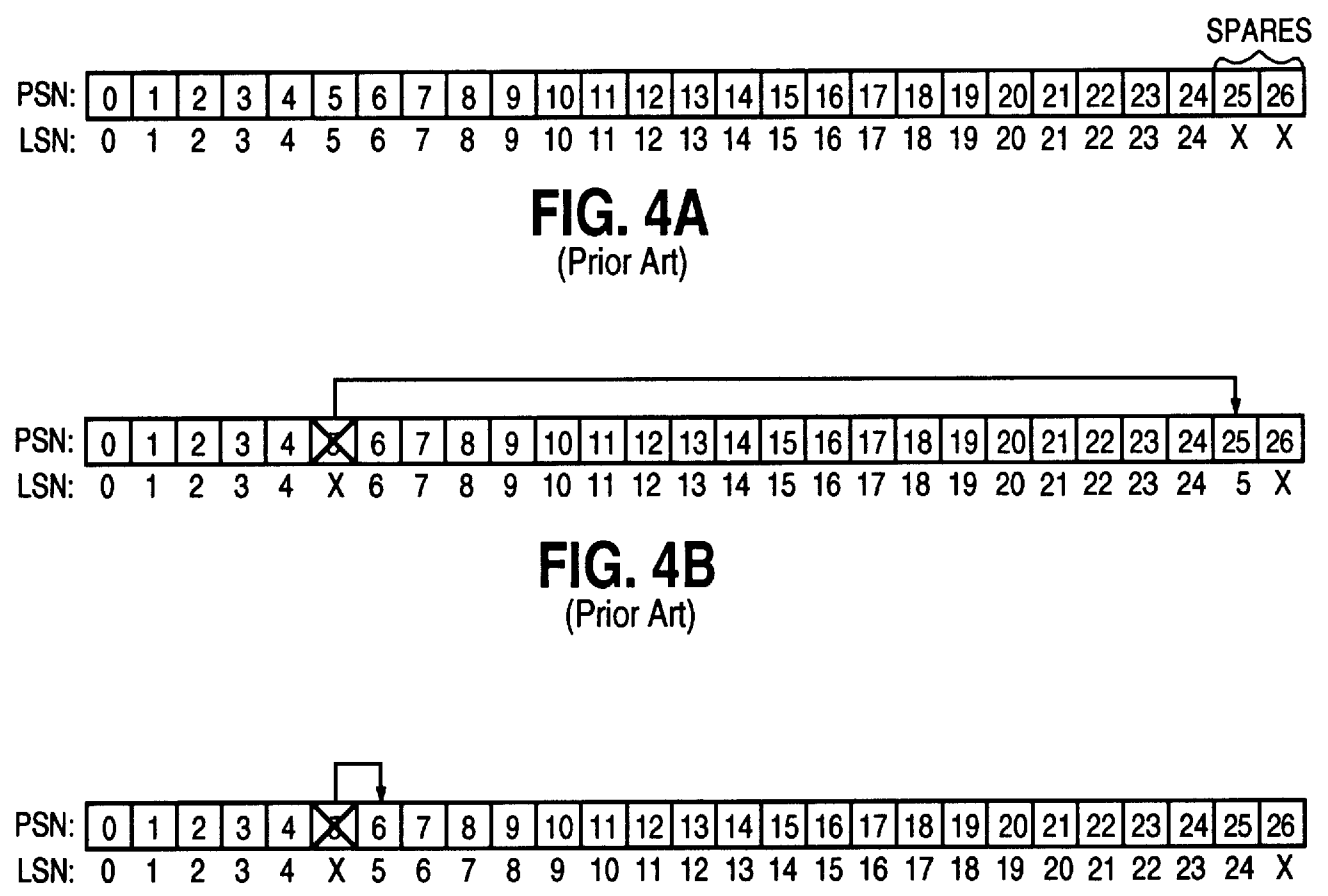

Referring now to FIGS. 4A–4C, shown are conventional methods for mapping a defective data sector to a spare sector. FIG. 4A shows spare sectors located at the end of a track wherein defect mapping is carried out by a conventional "linear replacement" method shown in FIG. 4B, or by a conventional "sector slipping" method shown in FIG. 4C. As mentioned above, sector slipping is normally performed only when the disc is formatted to avoid the complexity and volatility of slipping sectors that already contain user data. Thus, the linear replacement method of FIG. 4B is the most common method for mapping sectors that become defective after the disc drive is operating "in the field". However, as described above, there is a significant access latency associated with the linear replacement method: it typically requires an additional revolution per defect to read or write sectors in a contiguous LSN sequence.

FIG. 5A shows a track format of the present invention which overcomes the latency drawbacks intrinsic in the conventional linear replacement method of FIG. 4B. As illustrated in FIG. 5A, the enabling modification of the present invention is to disperse spare sectors throughout the track and between the data sectors at a regular interval, where defective sectors are mapped to the nearest available spare sector. Then by buffering in the data buffer 32 of FIG. 1 the data sectors between a defective sector and the corresponding replacement spare sector, it enables read and write operations on contiguous LSN sectors in a single revolution.

Consider, for example, that the seventh physical sector (PSN=6) is defective as shown in FIG. 5B. The present invention maps this sector to the first available spare sector, that is, to the twelfth physical sector such that $LSN_5=PSN_{11}$. During read and write operations, the sectors between the defective sector (PSN=6) and the spare sector (PSN=11) are buffered in the data buffer 32 of FIG. 1. This is illustrated by the graph in FIG. 5B which shows the number of sectors buffered in the data buffer 32 when writing or reading the entire track in one revolution.

FIG. 5C shows an example data track containing two defective sectors, PSN=6 and PSN=9. The first defective sector PSN=6 is mapped to the first available spare sector PSN=11 such that $LSN_5=PSN_{11}$, and the second defective sector PSN=9 is mapped to the next available spare sector PSN=17 such that $LSN_8=PSN_{17}$. The number of sectors buffered during a write or read of the entire track in one revolution is again shown in the graph of FIG. 5C. The graphs of FIG. 5B and 5C illustrate that the necessary size of the data buffer 32 for this particular function depends on the maximum number of sectors between defective sectors and the corresponding spare sectors. Obviously there is a trade off between buffer size and cost efficiency; but preferably, the buffer is large enough to handle most of the defect situations encountered, and if the buffer overflows due to an unusually large number of defective sectors, then the storage system will use more than one revolution to complete the write or read operation.

The necessary size of the buffer can be reduced by providing multiple spare sectors at a regular interval rather than a single spare sector at a regular interval as in FIG. 5A. In this manner, multiple defective sectors can be mapped to the nearest multiple spare sectors rather than having to buffer additional data sectors as shown in FIG. 5C. This implementation is a less efficient track format since it requires more spare sectors per track. However, the cost savings realized by minimizing the buffer size may outweigh this drawback in certain applications.

Figure 6A:
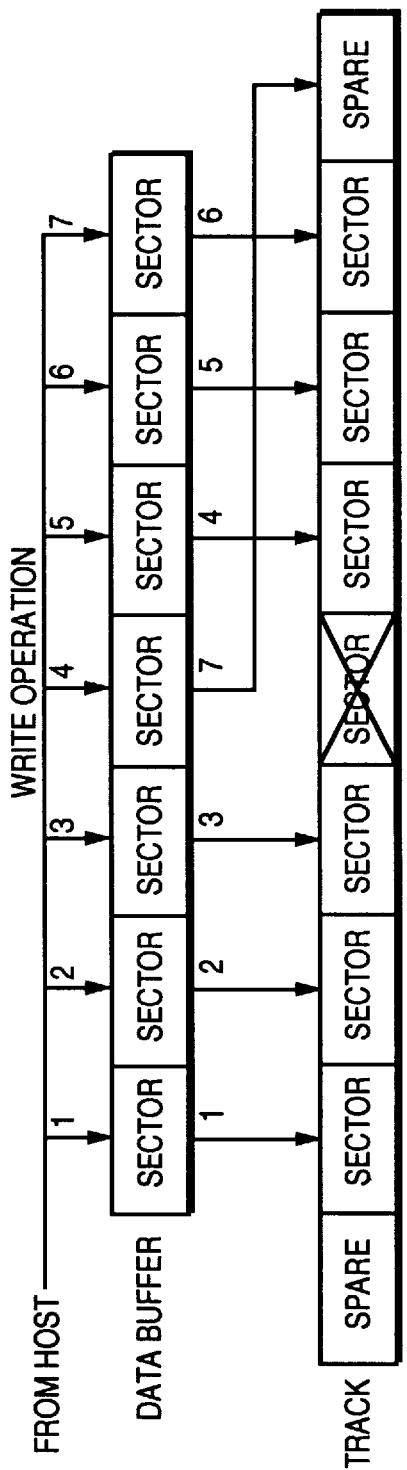
FIG. 6A shows operation of the data buffer in buffering a number of sectors between a defective sector and corresponding spare sector before writing the sectors to the track in one revolution.
Figure 6B:
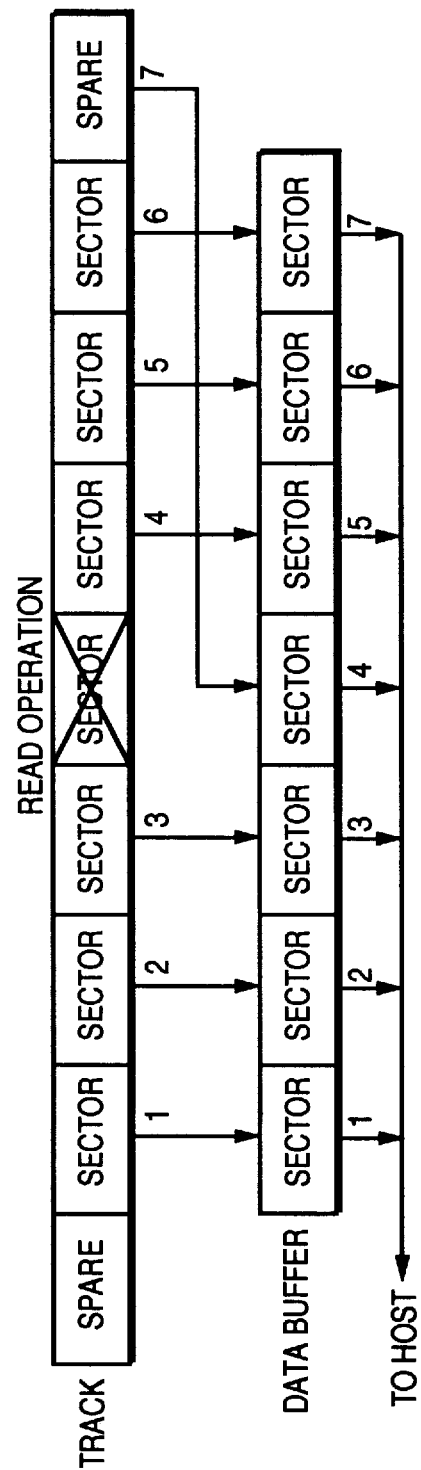
FIG. 6B shows operation of the data buffer in buffering a number of sectors between a defective sector and corresponding spare sector when reading the sectors from the track in one revolution.

The operation of the data buffer during write and read operations is better understood with reference to FIG. 6A and 6B. FIG. 6A illustrates how a number of data sectors received from the host are buffered in the data buffer 32 of FIG. 1 when a defective sector is encountered during a write operation. The data sectors received from the host are stored in the data buffer in a contiguous sequence as indicated by the numbered sequence 1–7 shown above the data buffer. As the write head passes over the track, the sectors are retrieved from the data buffer and written to the disc. When the write head encounters the defective sector, the storage system pauses the write operation until the write head passes over the defective sector. Once past the defective sector, the storage system skips over the data sector stored in the data buffer corresponding to the defective sector and the remaining data sectors are written to the track. When the write head reaches the spare sector that replaced the defective sector, the "skipped" data sector is written to the spare sector to complete the write operation in one revolution. Thus the numbered sequence 1–7 shown below the data buffer indicates the order in which the data sectors are retrieved from the data buffer and written to the track.

FIG. 6B illustrates operation of the data buffer 32 when reading the track of FIG. 6A which contains the defective sector. As the read head passes over the track, the sectors are read and stored in the data buffer. When the read head encounters the defective sector, the read operation is paused until the read head passes over the defective sector. An area in the data buffer is also skipped to reserve memory for storing the corresponding spare sector. The read operation then continues by reading and buffering the remaining sectors until the read head reaches the spare sector that replaced the defective sector. The spare sector is then read and stored in the reserved (or skipped) area of the data buffer to complete the read operation in one revolution as indicated by the numbered sequence 1–7 below the track. Thereafter, the data sectors are retrieved from the data buffer and transferred to the host system in a contiguous sequence as indicated by the numbered sequence 1–7 below the data buffer.

After retrieving and writing the sectors stored in the data buffer of FIG. 6A, the storage system may accept and overwrite these sectors in the data buffer with new data received from the host. Similarly, after transferring data from the buffer to the host, the "freed" area of the data buffer can be used to store more data read from the disc. Care must be taken, however, not to overwrite the data stored in the buffer corresponding to the spare sector (here the fourth sector) before it is written to the track in FIG. 6A, or before it is transferred to the host in FIG. 6B. To facilitate managing the spare sector data, an alternative embodiment is to reserve an area of the data buffer for storing the spare sector data rather than reserve a "skipped" area in the buffer every time a defective sector is encountered. In other words, an area of the buffer (for example the end of the data buffer) is permanently dedicated to storing data sectors associated with defective sectors. In this manner, the data associated with the non-defective sectors can be stored in the data buffer in a contiguous sequence, thereby providing a simple means to prevent overwriting the data sectors associated with spare sectors before they are processed.

Segment Defect Mapping

Another aspect of the present invention is the ability to determine the location of a defective segment within a sector and to map the defective segment to a spare segment rather than map the entire sector. This embodiment is more efficient for two reasons: the non-defective part of a sector is used rather than discarded, and less storage area is needed to store the spare segments. Preferably, a predetermined number of spare segments which are smaller than a spare sector are dispersed around the disc at a regular interval, where each spare segment comprises synchronization fields (preamble 114 and sync 116 of FIG. 3B) and ECC bytes 119 similar to a regular data sector. Since a spare segment is smaller than an entire spare sector, more spare segments can be dispersed around the disc while achieving the same format efficiency.

An alternative embodiment is to store a group of spare segments in each of the spare sectors dispersed around the track. Referring again to FIG. 5A, the sectors marked as spares (PSN=5,11,17,23 and 28) would comprise a predetermined number of spare segments for use in mapping defective segments from a plurality of defective sectors. In FIG. 5C, rather than map the first defective sector (PSN=5) to the first spare sector (PSN=11) and the second defective sector (PSN=9) to the next defective sector (PSN=17), the respective defective segments from the defective sectors are both mapped to spare segments in the first spare sector (PSN=11). This reduces the necessary size of the data buffer 32 of FIG. 1 because fewer data sectors are buffered as described above. However, this embodiment may require an extra revolution for a write command in order to read the spare sector, combine the relocated spare segment data with the spare sector, and then write the spare sector back to the disc.

Figure 6C:
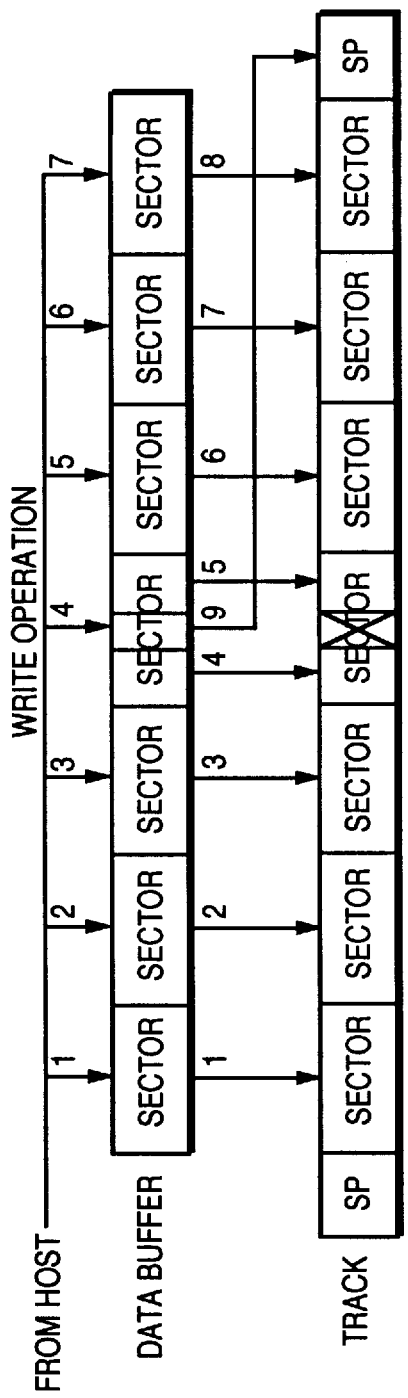
FIG. 6C shows operation of the data buffer in buffering a number of sectors between a defective sector and corresponding spare segment of a defective sector, before writing the sectors and the spare segment data to the track in one revolution.
Figure 6D:
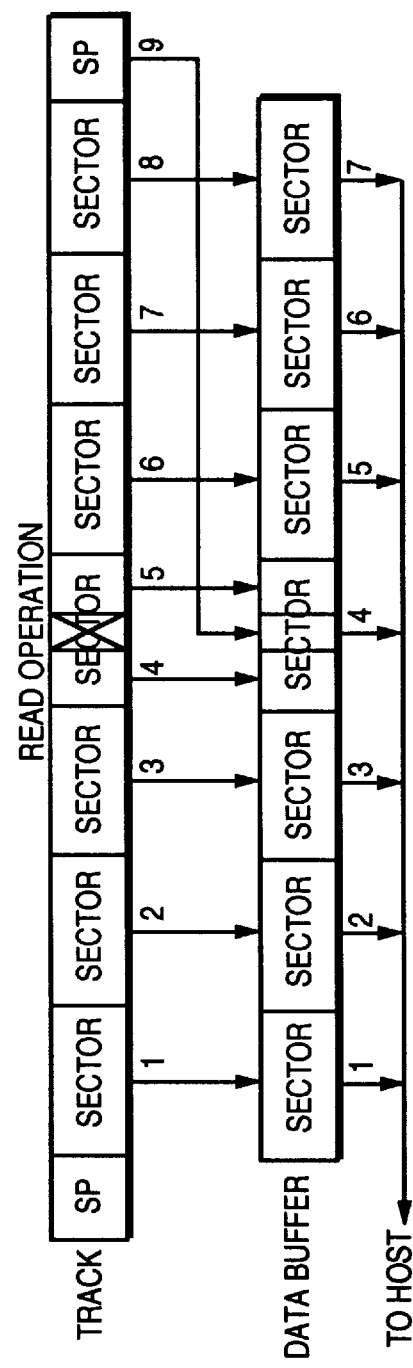
FIG. 6D shows operation of the data buffer in buffering a number of sectors between a defective sector and corresponding spare segment of a defective sector when reading the sectors from the track, including the spare segment of the defective sector, in one revolution.

FIG. 6C and 6D illustrate the operation of the data buffer when a single spare segment is dispersed at a regular interval around the track. The operation is similar to that of FIG. 6A and 6B for mapping the entire sector to a spare sector except that in this embodiment, only the defective segment is relocated. During a write operation, the data sectors preceding the defective sector are written to the track, as well as the portion of the defective sector up to the defective segment as indicated by the numbered sequence 1–4 below the data buffer. Then the defective segment and the corresponding write data in the data buffer are skipped over, and "0" bits are input into the redundancy/syndrome generator 20 of FIG. 1 to account for the relocated defective segment. The remainder of the defective sector is then written to the disc (including the ECC bytes 119 with the "0" fill adjustment), followed by the remaining sectors as indicated by the numbered sequence 5–8 below the data buffer. When the recording head reaches the spare segment, the corresponding write data stored in the data buffer is written to the track (write sequence #9). As in FIG. 6A, the embodiment of FIG. 6C enables a write operation to be performed in one revolution.

The transfer sequence during a read operation is shown in FIG. 6D, and as indicated by the numbered sequences below the track and below the data buffer, a read operation is performed in one revolution similar to FIG. 6B. While the recording head is passing over the defective segment, "0" bits are inserted into the redundancy/syndrome generator 20 of FIG. 1 to account for the relocated segment. That is, to generate the syndromes for the defective sector during a read operation, the defective segment is "zero-filled" so that the syndromes generated account for the relocated segment.

Figure 7A:
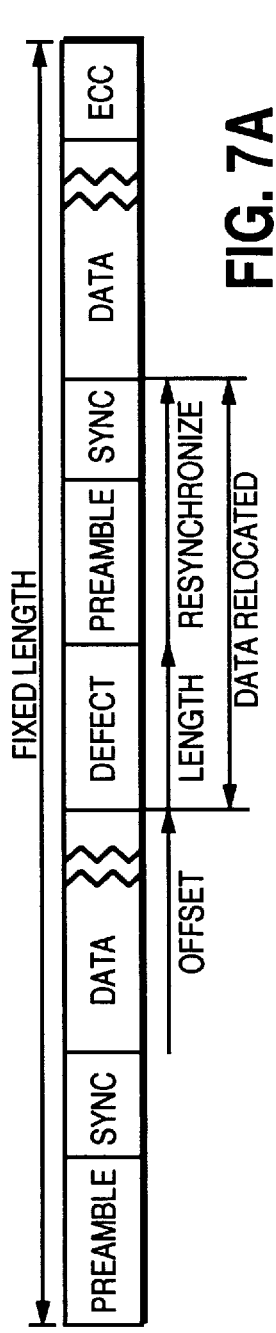
FIG. 7A shows a data sector comprising a mapped defective segment and timing information (preamble and sync) recorded after the defective segment for resynchronizing to the data.

The present invention provides four methods for determining the location of a defective segment within a sector: using the sector level ECS error syndromes, using the track level ECS error syndromes, using a test pattern, and using a defect detection system within a sampled amplitude read channel. The location of a defect is specified as an offset from the beginning of the sector and a length of the defective segment as shown in FIG. 7A. The defect length may be a programmable parameter, or it may be fixed to avoid using any memory to store this parameter. For instance, the defect length may be a predetermined fixed number for the entire disc, for each zone of the disc, or for each track. As mentioned above, the defect location information can be stored in a reserved area of the disc, in a header field of every data sector, or in a header field of those data sectors that have a defective segment.

A defective segment within a sector will result in a loss of byte synchronization over the data that follows the defective segment. A method for resynchronizing to the data field is to provide a secondary preamble and sync mark immediately after the defect as shown in FIG. 7A. In this manner, the timing recovery circuit 78 of FIG. 2 can re-establishes frequency and phase lock, and the sync mark detector 118 can resynchronize to the data field when the secondary sync mark is detected. A drawback to this method, however, is that it requires more than just the defective area of the sector to be relocated to a spare segment. That is, the secondary preamble and sync mark must be recorded over a valid part of the sector, thereby consuming more area than necessary in the data sector and in the spare segment that stores the relocated data.

An alternative embodiment which reduces the amount of data relocated is to write the secondary preamble over the defective segment rather than write it after the defective segment as shown in FIG. 7A. The assumption here is that the timing recovery circuit 78 of FIG. 2 will be able to read at least part of the secondary preamble and remain in frequency and phase lock over the defective segment. If so, the secondary sync mark can be successfully detected enabling resynchronization to the data field. The drawback of this method, of course, is that the defect may be too intrusive to remain frequency and phase locked over the defective segment.

Figure 7B:
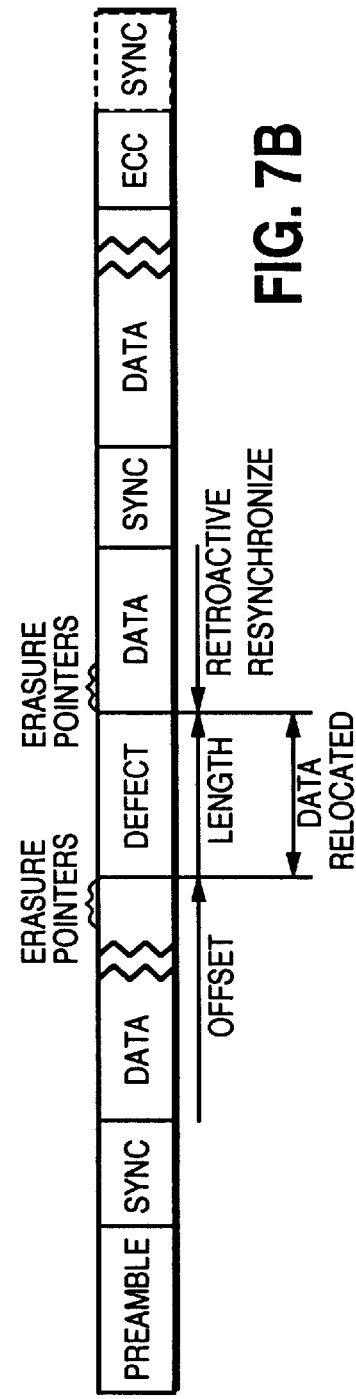
FIG. 7B shows an alternative embodiment for resynchronizing to the data field which employs retroactive resynchronization to avoid the overhead of addition timing information as in FIG. 7A.

What may be an even more efficient alternative embodiment is to employ retroactive resynchronization as shown in FIG. 7B. Rather than record a secondary preamble and sync mark directly after the defective segment, a secondary sync mark is recorded a predetermined number of data symbols past the defect. In this embodiment, timing recovery 78 in the read channel of FIG. 2 re-establishes frequency and phase lock over the user data between the defect and the secondary sync mark, rather than re-establish frequency and phase lock over a secondary preamble. The data between the defect and the secondary sync mark is also buffered in the sync buffer 112 of FIG. 2, and when the sync mark detector 118 detects the secondary sync mark, the data stored in the sync buffer 112 is retroactively resynchronized to the extent possible. The sync controller 120 of FIG. 2 may also generate erasure pointers 52 on one or both sides of the defect, as shown in FIG. 7B, to assist the sector level ECS of FIG. 1 in correcting residual errors caused by the defect. The erasure pointers may also be used to correct errors in the data detected after the defect and before frequency and phase lock are actually re-established. Compared to FIG. 7A, retroactive resynchronization of FIG. 7B is more efficient because it reduces the amount of data relocated to the spare segment.

In an alternative embodiment, multiple secondary sync marks are dispersed throughout the sector, including a sync mark at the end of the sector as shown in FIG. 7B. This embodiment provides even further protection against an inability to byte synchronize to the data in the event that one or more of the secondary sync marks has been corrupted by errors. The storage system need only detect one secondary sync mark to enable byte resynchronization over all of the data following a defective segment.

Figure 8A:
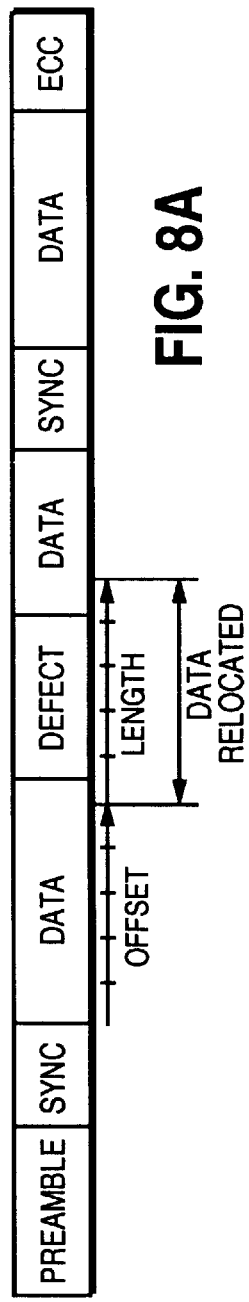
FIG. 8A and 8B show the offset and length specified in increments of a predetermined plurality of data symbols which reduces the overhead required to store this information.

As described previously, the defect location information (offset and length of a defective segment) may be stored in a reserved area of the disc and compiled into a list by the controller 38 of FIG. 1 when the storage system is powered on, or the information may be included in a header field of every sector or those sectors that comprise a defective segment. In any case, it is desirable to minimize the amount of information stored, but it is particularly important if the information is stored in a header field of the sector. Thus, another aspect of the present invention is to minimize the amount of information stored by decreasing the granularity of the defect location parameters. This is illustrated in FIG. 8A which shows the offset and length parameters of a defect specified in increments of a predetermined plurality of data symbols, where each data symbol comprises a predetermined plurality of data bits. In this manner, fewer number of bits are required to specify the offset and length of a defect, but as illustrated in FIG. 8A, it may also result in more data being relocated than necessary (i.e., data may be relocated that are outside of the defective segment).

Figure 8B:
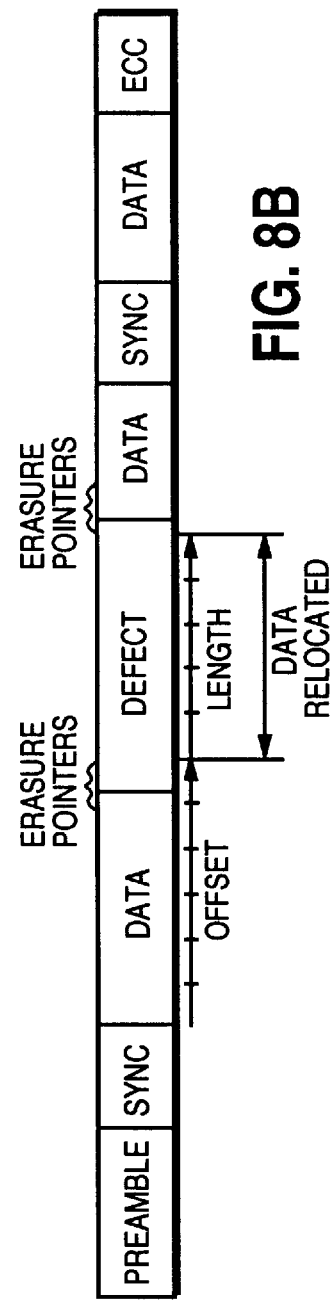

An alternative embodiment is to specify the offset and length such that less than the entire defective segment is relocated as shown in FIG. 8B. In this embodiment, erasure pointers are generated to assist the sector level ECS of FIG. 1 to correct the errors caused by the residual defective area not relocated. This embodiment is the most efficient because it minimizes both the memory necessary to store the defect location parameters as well as the amount of data relocated. With this embodiment, however, it may be necessary to increase the complexity and redundancy of the sector level ECS to account for the additional errors caused by the unmapped defective area.

The objects of the invention have been fully realized through the embodiments disclosed herein. Those skilled in the art will appreciate that the aspects of the invention can be achieved through various other embodiments without departing from the essential function. For example, the buffer 32 of FIG. 1 could be implemented at the host system and the buffering effectuated through an appropriate communication interface which directs where to store read/write data relative to the spare sectors or segments. The particular embodiments disclosed are illustrative and not meant to limit the scope of the invention as appropriately construed from the following claims.

We claim:

1. An apparatus for accessing a disc storage medium, wherein the disc storage medium comprises a plurality of data tracks; and at least one data track comprises a plurality of data sectors, and a plurality of spare segments interspersed between the data sectors at a predetermined interval around the track; the apparatus comprising:
    (a) a device input connected to receive an estimated data sequence in a substantially continuous stream, the estimated data sequence representing at least one data sector of a selected data track recorded on the disc storage medium;
    (b) a defect management system for determining a location within the estimated data sequence where a corresponding defective segment of the selected data track is mapped to one of the spare segments interspersed around the track; and
    (c) a data buffer for storing the estimated data sequence of a plurality of data sectors, wherein:
        (i) an area in the data buffer is reserved to store the mapped data; and
        (ii) when the spare segment containing the mapped data is read, the estimated data sequence representing the mapped data is stored in the reserved area of the data buffer.

2. The apparatus as recited in claim 1, wherein:
    (a) the estimated data sequence is stored in a contiguous segment of the data buffer; and
    (b) the reserved area of the data buffer for storing the mapped data is a skipped part of the contiguous segment.

3. The apparatus as recited in claim 1, wherein:
    (a) the data stored in the data buffer is transferred to a host system; and
    (b) the data transfer is delayed relative to when the mapped data is read and stored in the reserved area of the data buffer.

4. The apparatus as recited in claim 1, wherein the defective segment is an entire data sector.

5. The apparatus as recited in claim 1, wherein the defective segment is part of a data sector.

6. The apparatus as recited in claim 1, further comprising a host input connected to receive user data from a host system to be written to a selected data track, wherein:
    (a) the user data is first stored in the data buffer and then written to the selected data track;
    (b) the user data stored in the data buffer is written to the selected track in a substantially continuous stream until the defect management system determines a location in the user data corresponding to a defective segment of the selected data track, at which time the data writing is paused and the defective segment is skipped;
    (c) after skipping the defective segment, the user data corresponding to the defective segment is left in the data buffer and the remainder of the user data stored in the data buffer is written to the selected track; and
    (d) the user data left in the data buffer corresponding to the defective segment is written to at least one of the spare segments.

7. The apparatus as recited in claim 6, wherein the user data is written to the selected track within one revolution of the disc.

8. The apparatus as recited in claim 1, wherein the defect management system further comprises:
    (a) a defective segment locator for locating a defective segment within a data track; and
    (b) a segment mapper for mapping a defective segment to a spare segment.

9. The apparatus as recited in claim 8, wherein the defect management system further comprises a threshold criteria for determining when to map the defective segment.

10. The apparatus as recited in claim 9, wherein the threshold criteria comprises a maximum number of errors detected by a sector level error detection and correction system.

11. The apparatus as recited in claim 8, wherein the segment mapper maps the defective segment to a nearest available spare segment past the defective segment.

12. The apparatus as recited in claim 1, further comprising an erasure pointer generator for generating erasure pointers approximate to at least one end of the defective segment, the erasure pointers for use by a sector level error detection and correction system for detecting and correcting errors in the estimated data sequence.

13. The apparatus as recited in claim 1, wherein the estimated data sequence is read and stored in the data buffer within one revolution of the disc.

14. An apparatus for accessing a disc storage medium, wherein the disc storage medium comprises a plurality of data tracks; and at least one data track comprises a plurality of data sectors, at least one defective segment within at least one of the data sectors, and at least one spare segment; the apparatus comprising:
    (a) a device input connected to receive an estimated data sequence in a substantially continuous stream, the estimated data sequence representing at least one data sector of a selected data track recorded on the disc storage medium; and
    (b) a defect management system comprising defect location information for mapping the defective segment within the data sector to the spare segment, the location information comprising an offset from a predetermined point in the data sector to the beginning of the defective segment.

15. The apparatus as recited in claim 14, wherein the offset is specified in increments of a predetermined plurality of data symbols, where each data symbol comprises a predetermined plurality of data bits.

16. The apparatus as recited in claim 14, wherein the defect location information further comprises a length of the defective segment.

17. The apparatus as recited in claim 16, wherein the length of the defective segment is specified in increments of a predetermined plurality of data symbols, where each data symbol comprises a predetermined plurality of data bits.

18. The apparatus as recited in claim 16, wherein the length of the defective segment is programmable.

19. The apparatus as recited in claim 14, wherein the selected data track comprises a plurality of spare segments interspersed between the data sectors at a predetermined interval.

20. The apparatus as recited in claim 14, further comprising a data buffer for storing the estimated data sequence, wherein:

(a) an area in the data buffer is reserved to store data corresponding to the spare segment;

(b) data recorded on the track preceding the spare segment is read and buffered in the data buffer; and (c) when the spare segment is read, the corresponding estimated data sequence is stored in the reserved area of the data buffer.

21. The apparatus as recited in claim 20, wherein the data sector comprising the defective segment is read within one revolution of the disc.

22. The apparatus as recited in claim 20, further comprising a syndrome generator for generating syndromes used to correct errors in the data segment that comprises the defective segment, wherein operation of the syndrome generator is adjusted to account for the defective segment.

23. The apparatus as recited in claim 14, wherein when writing data to the data sector comprising the defective segment, the defect location information is used to skip the defective segment and to write the corresponding data to a spare segment.

24. The apparatus as recited in claim 23, wherein:

(a) a plurality of spare segments are interspersed between the data sectors at a predetermined interval; and (b) the defect location information maps the defective segment to a nearest available spare sector past the defective segment.

25. The apparatus as recited in claim 14, wherein the defect management system further comprises a defect locator for locating a defective segment within a data sector.

26. The apparatus as recited in claim 25, wherein the defect locator comprises a defect detection filter in a sampled amplitude read channel.

27. The apparatus as recited in claim 25, wherein the defect locator comprises a sector level error detection and correction system.

28. The apparatus as recited in claim 25, wherein the defect locator comprises a track level error detection and correction system.

29. The apparatus as recited in claim 25, wherein the defect locator comprises a means for writing a test pattern to the data sector and a means for comparing the estimated data sequence to the test pattern during readback.

30. The apparatus as recited in claim 14, wherein the defect management system further comprises a preamble writer for writing a preamble at the end of the defective segment for re-acquiring frequency and phase lock.

31. The apparatus as recited in claim 14, wherein the defect management system further comprises a preamble writer for writing a preamble over the defective segment for retaining frequency and phase lock over the defective segment.

32. The apparatus as recited in claim 14, wherein the defect management system further comprises a sync mark writer for writing a sync mark at the end of the defective segment for re-acquiring byte synchronization.

33. The apparatus as recited in claim 14, wherein the defect management system further comprises a retroactive byte synchronization system for retroactively byte synchronizing to the data sector using a sync mark recorded past the defective segment.

34. The apparatus as recited in claim 14, further comprising an erasure pointer generator for generating erasure pointers approximate to at least one end of the defective segment, the erasure pointers for use by a sector level error detection and correction system for detecting and correcting errors in the estimated data sequence.

35. The apparatus as recited in claim 14, wherein the data sector comprising the defective segment is read within one revolution of the disc.

\* \* \* \* \*